(12) United States Patent
Ning

(10) Patent No.: US 10,901,177 B2
(45) Date of Patent: *Jan. 26, 2021

(54) FOVEA LENS

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/211,495

(22) Filed: Dec. 6, 2018

(65) Prior Publication Data

US 2020/0183129 A1  Jun. 11, 2020

(51) Int. Cl.
*G02B 13/00* (2006.01)
*G02B 9/12* (2006.01)

(52) U.S. Cl.
CPC ............ *G02B 13/0035* (2013.01); *G02B 9/12* (2013.01)

(58) Field of Classification Search
CPC .............................. G02B 13/0035; G02B 9/12
USPC .................................................. 359/708, 716
See application file for complete search history.

(56) References Cited

U.S. PATENT DOCUMENTS

| | | | |
|---|---|---|---|
| 5,371,626 A | * | 12/1994 | Betensky ............... G02B 23/00 359/399 |
| 6,867,933 B2 | | 3/2005 | Matsusaka |
| 7,800,681 B2 | | 9/2010 | Azuma |
| 8,654,457 B2 | | 2/2014 | Jin et al. |
| 9,519,122 B2 | | 12/2016 | Huang |
| 2004/0179100 A1 | | 9/2004 | Ueyama |
| 2004/0257677 A1 | * | 12/2004 | Matsusaka ........... H04N 5/2254 359/783 |
| 2005/0174463 A1 | | 8/2005 | Ohzawa et al. |
| 2009/0219631 A1 | * | 9/2009 | Ning ........................ G02B 9/62 359/716 |
| 2014/0307335 A1 | | 10/2014 | Kawamura |
| 2017/0242220 A1 | | 8/2017 | Lee |

* cited by examiner

*Primary Examiner* — James R Greece
(74) *Attorney, Agent, or Firm* — Mark Wisnosky

(57) ABSTRACT

Wide angle fovea lens and a camera design using the lens are described. The lens has three lens groups and includes a single aspherical lens element. The lenses have higher magnification on the optical axis than at angles off the optical axis.

4 Claims, 7 Drawing Sheets

FOVEA LENS

CROSS-REFERENCE TO RELATED APPLICATIONS

This application is a continuation of U.S. application Ser. No. 15/636,862 filed Jun. 29, 2017, and, currently pending, and, claims priority to U.S. Provisional Application 62/357,965, filed Jul. 2, 2016, both applications titled Fovea Lens, by the same inventor.

STATEMENT REGARDING FEDERALLY SPONSORED RESEARCH OR DEVELOPMENT

Not Applicable.

BACKGROUND OF THE INVENTION

Technical Field

The invention relates to wide-angle lenses with higher on-axis magnification than off-axis magnification.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including not only mobile phones, cameras, sports cameras, computers and computer peripherals, but now also surveillance devices, vehicles, drones and other devices where the lenses and associated imaging system are used for real time guidance of vehicles and surveillance analyses. Incorporation of the lenses into new devices places new environmental performance requirements upon the lens. The lens must be compact and light, to be used in portable devices, and must still maintain high performance characteristics.

These lenses are being used more and more in consumer application where literally millions of such lens systems must be easily produced at consistent high quality and at low cost. New applications require custom lens features. One example of the custom features is varying resolution across the field of view of the lens.

New applications such as use in self-driving vehicles, drones and surveillance benefit from designs with both a wide field of view but also higher magnification in a portion of the field of view. In some cases, the wide field of view is to detect any object in the field of view and the higher magnification is used to identify the object. These application require continuous acquisition of image data. This generates very large datasets that must be analyzed in real time to guide the vehicle, drone or to make decisions regarding surveillance. Analyzing the data from the entire field of view for identification of objects within the field is often beyond the computation capabilities of on-board processors. There is a need to provide higher magnification in a portion of the field of view, typically the center and lower magnification in the periphery where the need for data analysis is lessened. Lenses with the property of higher magnification at the center near the optical axis and lower magnification further off-axis are called fovea lenses. The human eye has such an imaging system. In a camera the result of using a fovea lens is higher pixel density in higher magnification areas. In such designs, pixel density is defined as the number of pixels intersected per unit degree of the field of view. Frequently design requirements for surveillance and other applications require a 4 or 5-fold higher pixel density at 0 degrees—that is for objects on the optical axis of the lens and camera, versus objects that are off axis perhaps at the maximum field of view of the lens/camera system. The field of view of such lens systems typically vary from 100 to 180 degrees. Although the two areas of the lens may be analyzed to different degrees, all of the image areas require high optical performance including low F number and low color aberration, and, must achieve this performance in a compact, low cost package.

Current art requires such lens systems be made using a plurality of aspherical and complex aspherical lens elements. Aspherical lens elements add significantly to the cost and the difficulty of manufacturing. Prior-art fovea lenses (for example U.S. Pat. No. 6,867,933) require a minimum of two aspherical elements to achieve satisfactory optical performance and still achieve only a relative aperture about f/1.8 or higher.

There is a need for new lens designs that exhibit low color aberration especially for wide-angle (field of view greater than 80°) and super wide-angle lens designs (field of view greater than 170°) and at the same time provide higher magnification near the optical axis than off-axis. There is also need to provide such lens designs that can be manufactured inexpensively, consistently and can be automatically assembled. There is a need for a lens system that has higher magnification in the region near the optical axis than at higher field angles and is made with a single aspherical lens element while all remaining lens elements are spherical elements.

BRIEF SUMMARY OF THE INVENTION

The present invention comprises a lens system and a camera made with such a wide angle fovea lens system that has a higher magnification near the optical axis than at angles off the optical axis of the lens/camera system.

The lens of the present invention comprises three lens groups:
1) A first group (counting from the object side) having a negative refractive power comprises an aspheric element with negative power. The effective focal length of this group is F1. An aspheric element defined as lens element having at least one aspheric surface, which is generally described by the following well-known equation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \quad (1)$$

Refer to Zemax manual (www.zemax.com) for a detailed explanation of terms used in this equation. The aspheric element is a progressively powered element. The object surface of the aspheric element (defined as the surface facing the object side) is convex and has positive surface power on-axis. The surface power is progressively decreased from center to the edge of the surface aperture. It becomes negative near the edge of the clear aperture. The image surface of the aspheric element is concave and has negative surface power on-axis. The surface power of the image surface is becoming progressively less negative going from center towards the edge of the clear aperture. The element power of the aspheric element is negative on-axis, and becomes progressively more negative towards the edge of the element. The aspherical element has an effective focal length of Fa paraxially, and a center thickness of Ta. In preferred embodiments, the aspheric element is made of glasses with Nd>1.6, and Vd>35.

2) A second group having a positive power comprising at least one element. All elements are spherical in this group.
3) A third group having a positive power comprising a cemented doublet or triplet. All elements are spherical in this group. An aperture stop is located between group 2 and 3.

All elements in group 2 and 3 are spherical elements. There is only one aspherical element in the $1^{st}$ group. In preferred embodiments, at least one of the positive lens elements in group 2 and 3 is made with materials having a negative dn/dT value where n is the index of refraction at d-line, and T is the temperature. Aspheric elements are complex and difficult to manufacture. The present invention uses only a single aspheric element in the $1^{st}$ group, thus reducing the manufacturing risks of aspheric elements. In the preferred embodiment the following conditional expressions are satisfied:

$$0.4 < Ta/F < 0.75 \quad (2)$$

$$0.08 < Ta/TTL < 0.25 \quad (3)$$

$$1.2 < |Fa|/F < 2.7 \quad (4)$$

$$1 < |F1|/F < 1.6 \quad (5)$$

where F is the effective focal length of the entire lens assembly, Fa the effective focal length (on-axis) of the aspheric element, and F1 the effective focal length of group 1. Ta is the center thickness of the aspheric element.

In a preferred embodiment, the field of view of the lens assembly is equal or greater than 100 deg. The image height at a half field angle +/−50 degrees is IH50 and equation (6) is satisfied.

$$0.4 < IH50/(F*\text{Tan}(50)) < 0.7 \quad (6)$$

For a more general field of view the following equation (7) is satisfied.

$$IH(\Theta) < F*\sin(\Theta), \text{ for } \Theta > 0 \quad (7)$$

When (6), (7) are satisfied the magnification of the lens assembly is highest on-axis and is decreasing progressively towards the edge of the field. In all embodiment equations (2)-(7) are satisfied.

The specific examples are not intended to limit the inventive concept to the example application. Other aspects and advantages of the invention will be apparent from the accompanying drawings and detailed description.

DETAILED DESCRIPTION OF THE INVENTION

FIGS. 1-5 show five embodiments of the fovea lens designs. The Figures also serve as diagrams for the specific examples 1-5 listed and discussed below.

Figure 1:
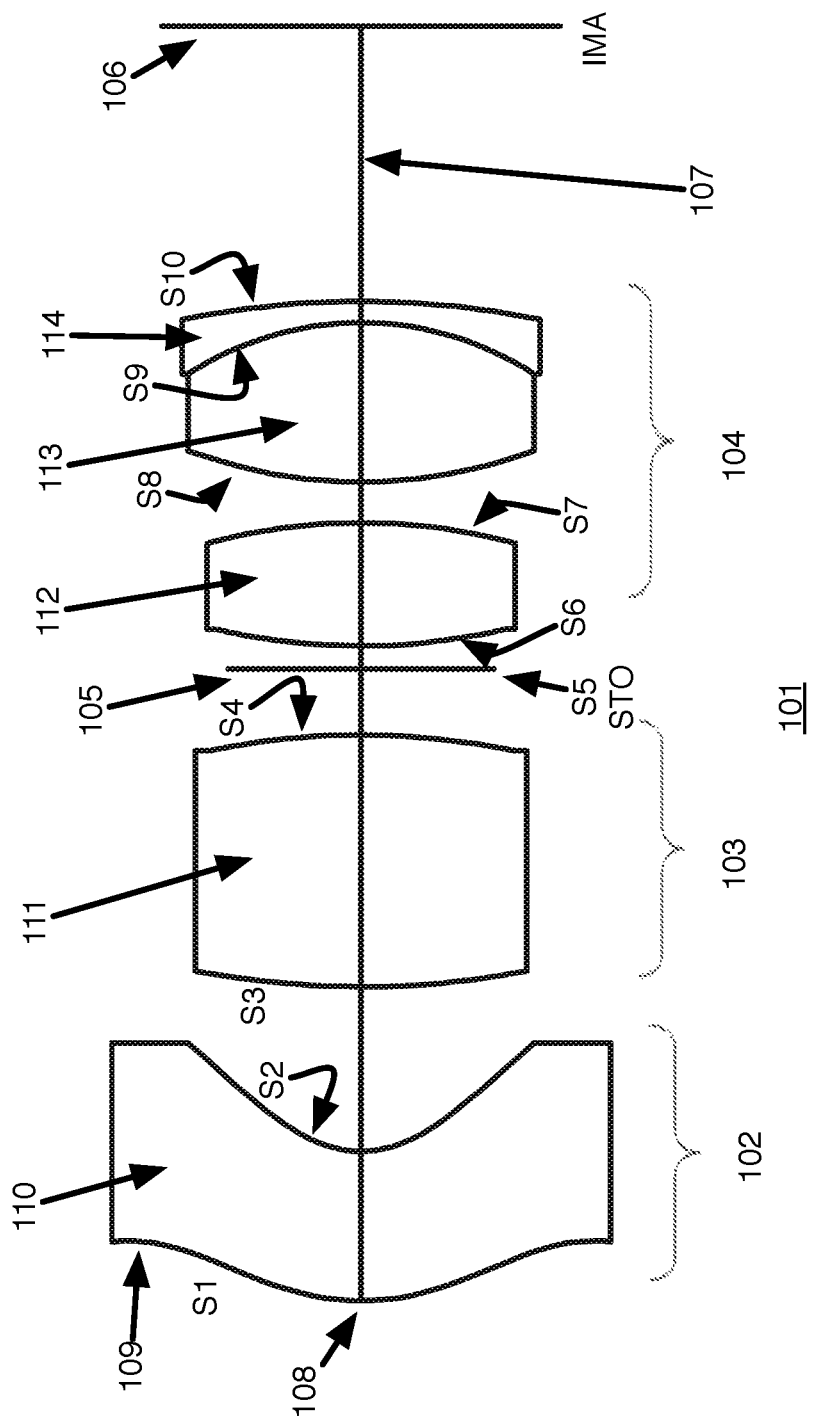
FIG. 1 is a diagram of a wide angle fovea lens having 5 lens elements.

Referring to FIG. 1, the radius of curvature in all examples is measured at the point on the lens element 110-114 intersecting the optical axis 107 of the wide-angle lens 101. The description of the lens elements as flat, convex or concave refers to the curvature at this point on the lens surface that intersects the optical axis. A lens surface may also be aspherical The term lens or wide-angle lens refers to the wide-angle lens 101 that is comprised of a plurality of lens elements 110-114. Each lens element by itself is also known in the literature as a lens. Here, lens refers to the multi-component system. The first exemplary embodiment of the invented wide angle fovea lens is shown in FIG. 1. The wide angle fovea lens 101 is comprised of five lens elements 110-115 centered about the optical axis 107 from object end 108 to image 106. The lens is divided into three lens groups 102, 103, 104. The first lens group 102 nearest the object end 108 is comprised of a single aspheric lens element 110. Both the object surface S1 and the image surface S2 are aspheric. The aspheric surfaces are described by equation 1 where the values for the aspheric equation in a nonlimiting specific example are given in Table 1B. The first lens group has negative power. The second lens group 103 is, in this embodiment, comprised of a single spherical lens element 111 having surfaces S3 and S4. The second lens group 103 has positive power. There is an aperture stop 105, S5 between the second lens group 103 and the third lens group 104. The third lens group 104 is comprised of three lens elements 112, 113, 114 where lens elements 113 and 114 form a cemented doublet having surfaces S8, S9 and S10. Lens element 112 has surfaces S6 and S7. The third lens group 104 has positive power. In a camera formed from this lens design an image sensor is located at the image plane 106. A specific example of a lens made according to FIG. 1 is listed below as Example 1. In one embodiment the optical elements of the lens consist solely of the five lens elements 110-114 as shown. The lens has higher magnification at the optical axis 107, 108 than at the edge of the lens 109 all equations (2)-(7) are satisfied. In preferred embodiments, at least one of the positive lens elements in group 2 and 3 is made with materials having a negative dn/dT value where n is the index of refraction at d-line, and T is the temperature.

The general form of the description including numbering of lens surfaces from object S1 to image S10 is used in the descriptions of all embodiments of FIGS. 2-5. As such all surfaces are not numbered in subsequent Figures but follow the same, well known, scheme.

Figure 2A:
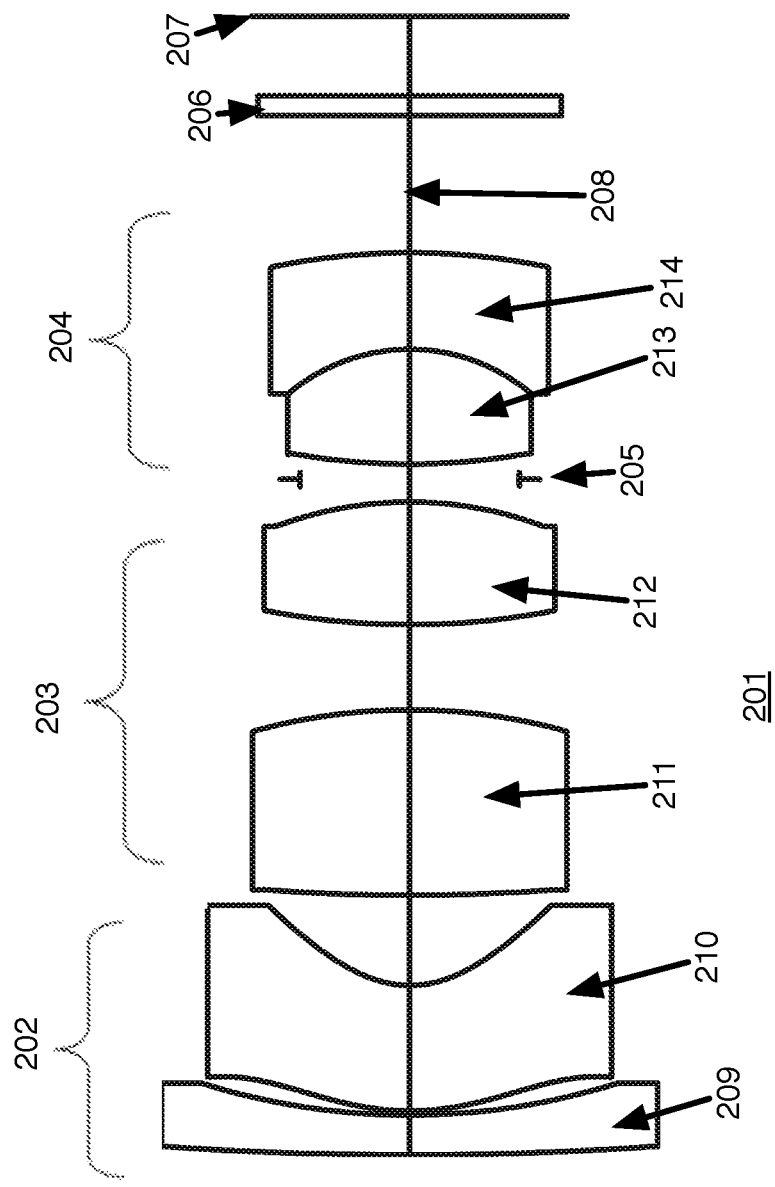
FIG. 2A is a diagram of a wide angle fovea lens having 6 lens elements.

FIG. 2A shows a wide angle fovea lens design 201 that includes 6 optical elements 209-214, each aligned about and along the optical axis 208. The lens elements are divided into three lens groups. The first lens group 202 includes two negative power lens elements 209, 210. The first lens element 209 is spherical and the second lens element 210 is aspherical. Both the object (S3) and image (S4) surface of this lens element 210 are aspherical. The second lens group 203 includes two positive powered, spherical lens elements 211, 212. Lens groups two 203 and three 204 are separated by an aperture stop 205. The third lens group has positive power and includes a cemented doublet 213, 214. A filter 206 is shown in the design between the third lens group and the image plane 207. In one embodiment the wide angle fovea lens 201 of FIG. 2A consists solely of the lens elements as shown. In another embodiment additional lens elements may be added to the design. However, the lens 201 with just the lens elements 209-214, as shown, satisfy the parametric equations 2-7. Only the first lens group 202 includes an aspheric element 210. All of the lens elements of groups two 203 and three 204 are spherical. In preferred embodiments, at least one of the positive lens elements in group 2 and 3 is made with materials having a negative dn/dT value where n is the index of refraction at d-line, and T is the temperature. A specific example of a lens made with the design of FIG. 2A is shown below as Example 2.

Figure 2B:
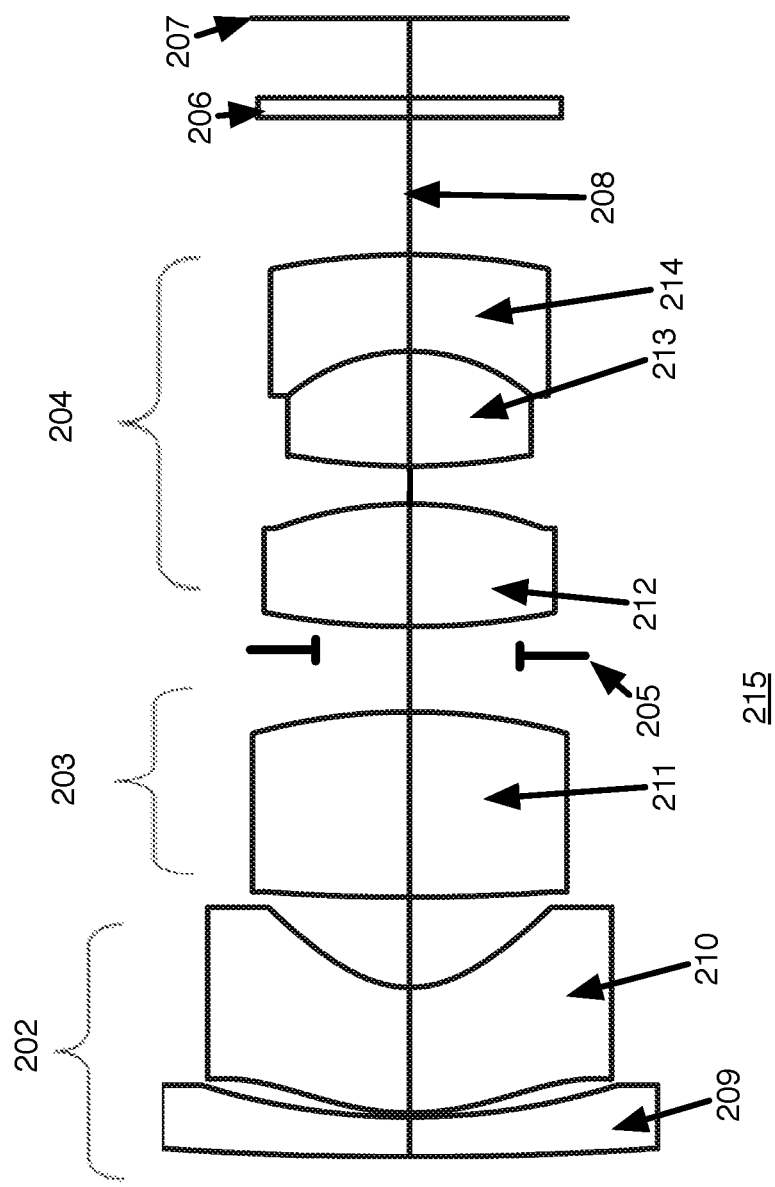
FIG. 2B is a diagram of a second embodiment of a wide angle fovea lens having 6 lens elements.

In a similar six lens design, shown in FIG. 2B, the aperture 205 is moved in front of the lens element 212. Thus group 1 has two lens elements, group 2 has a single lens element, group three has three lens elements, all spherical with a first spherical lens element 212 and a cemented doublet consisting of two spherical lens elements 213, 214. In one embodiment the wide angle fovea lens 215 of FIG. 2B consists solely of the lens elements as shown. In another embodiment additional lens elements may be added to the design. However, the lens 215 with just the lens elements 209-214, as shown, satisfy the parametric equations 2-7. Only the first lens group 202 includes an aspheric element 210. All of the lens elements of groups two 203 and three 204 are spherical. In preferred embodiments, at least one of the positive lens elements in group 2 and 3 is made with materials having a negative dn/dT value where n is the index of refraction at d-line, and T is the temperature.

Figure 3:
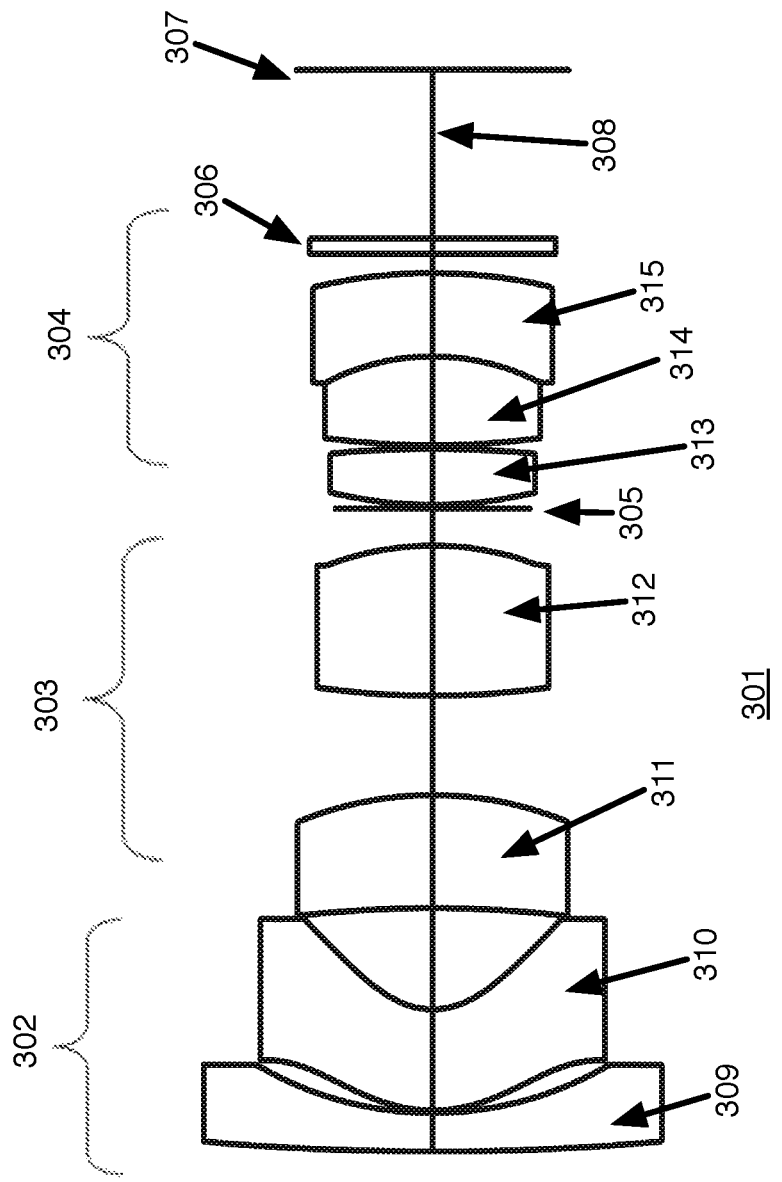
FIG. 3 is a diagram of a wide angle fovea lens having 7 lens elements.

FIG. 3 shows a wide angle fovea lens design 301 that includes 7 optical elements 309-315, each centered on and precisely spaced along the optical axis 308. The lens elements are divided into three lens groups. The first lens group 302 includes two negative power lens elements 309, 310. The first lens element 309 is spherical and the second lens element 310 is aspherical. Both the object (S3) and image (S4) surface of this lens element 310 are aspherical. The second lens group 303 has positive power, and includes two spherical lens elements 311, 312. Lens groups two 303 and three 304 are separated by an aperture stop 305. The third lens group 304 has positive power and includes three lens elements 313, 314, 315. The last two lens elements 313, 314, nearest the image 307, are a cemented doublet. A filter 306 is shown in the design between the third lens group and the image plane 307. In one embodiment the wide angle fovea lens 301 of FIG. 3 consists solely of the lens elements as shown. In another embodiment additional lens elements may be added to the design. However, the lens 301 with just the lens elements 309-315, as shown, satisfy the parametric equations 2-7. Only the first lens group 302 includes an aspheric element 310. All of the lens elements of groups two 303 and three 304 are spherical. In preferred embodiments, at least one of the positive lens elements in group 2 and 3 is made with materials having a negative dn/dT value where n is the index of refraction at d-line, and T is the temperature. A specific example of a lens made with the design of FIG. 3 is shown below as Example 3.

Figure 4:
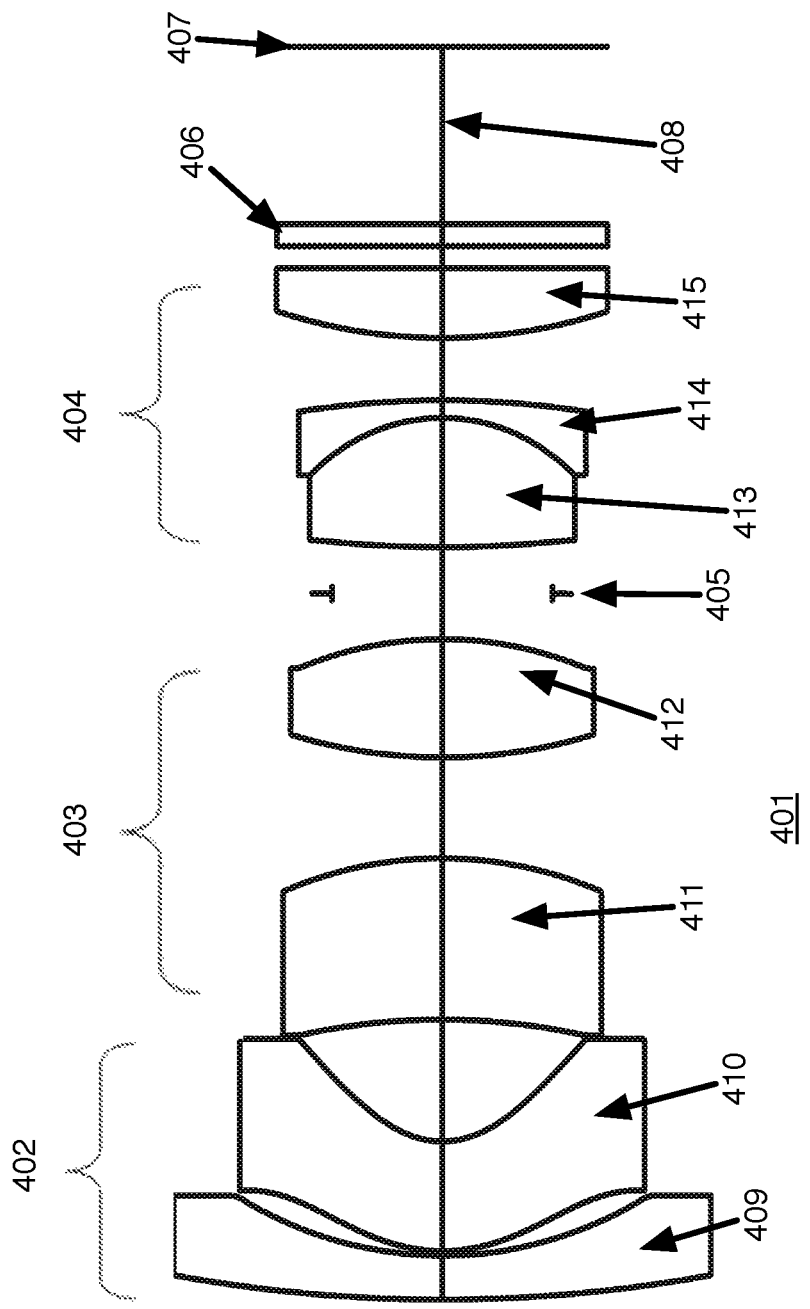
FIG. 4 is a diagram of a second embodiment of a wide angle fovea lens having 7 lens elements.

FIG. 4 shows a wide angle fovea lens design 401 that includes 7 optical elements 409-415, each entered on and precisely spaced along the optical axis 408. The lens elements are divided into three lens groups. The first lens group 402 includes two negative power lens elements 409, 410. The first lens element 409 is spherical and the second lens element 410 is aspherical. Both the object (S3) and image (S4) surface of this lens element 410 are aspherical. The second lens group 403 has positive power, and includes two spherical lens elements 411, 412. Lens groups two 403 and three 404 are separated by an aperture stop 405. The third lens group 404 has positive power and includes three lens elements 413, 414, 415. The first two lens elements 413, 414, nearest the object, are a cemented doublet. A filter 406 is shown in the design between the third lens group and the image plane 407. In one embodiment the wide angle fovea lens 401 of FIG. 4 consists solely of the lens elements as shown. In another embodiment additional lens elements may be added to the design. However, the lens 401, with just the lens elements 409-415, as shown, satisfy the parametric equations 2-7 Only the first lens group 402 includes an aspheric element 410. All of the lens elements of groups two 403 and three 404 are spherical. In preferred embodiments, at least one of the positive lens elements in group 2 and 3 is made with materials having a negative dn/dT value where n is the index of refraction at d-line, and T is the temperature. A specific example of a lens made with the design of FIG. 4 is shown below as Example 4.

Figure 5:
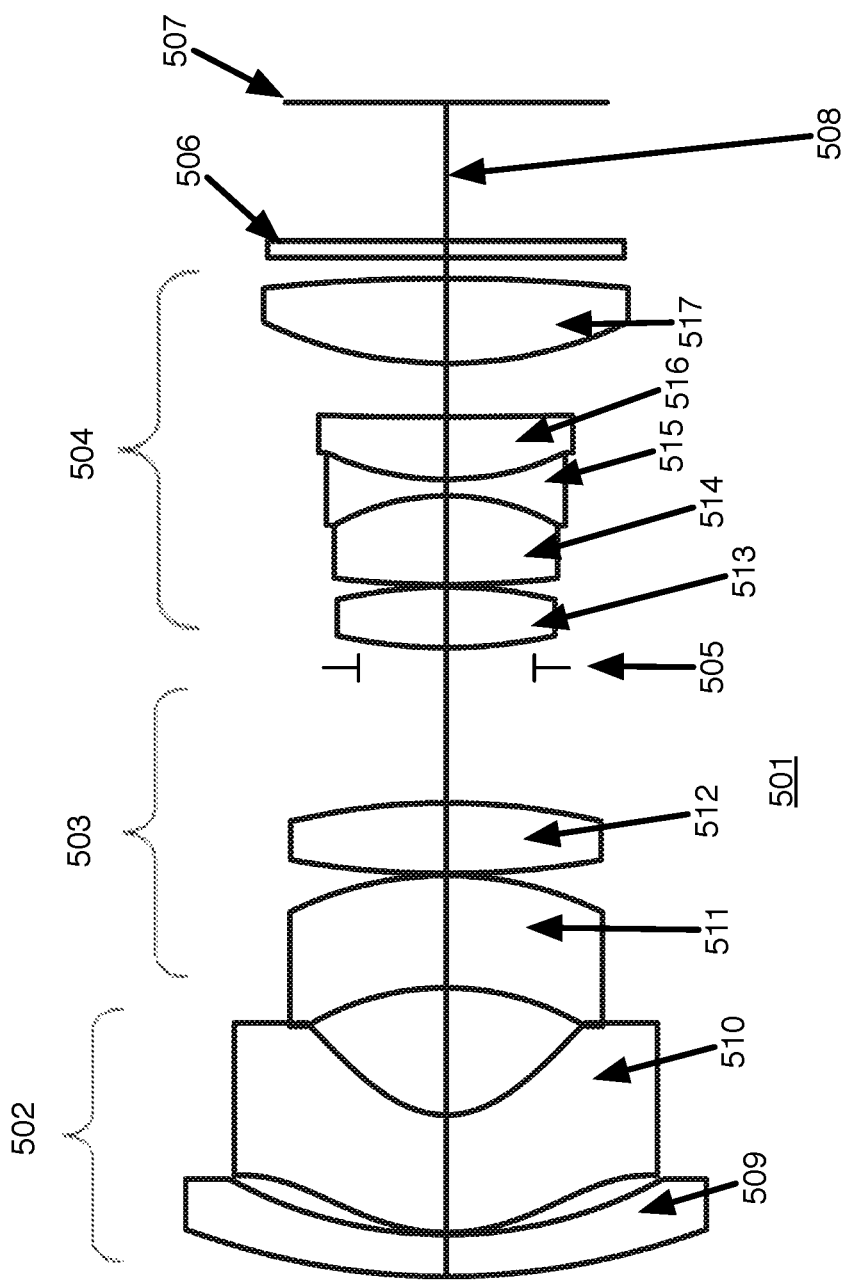
FIG. 5 is a diagram of a wide angle fovea lens having 9 lens elements.

FIG. 5 shows a wide angle fovea lens design 501 that includes 9 optical elements 509-517, each centered on and precisely spaced along the optical axis 508. The lens elements are divided into three lens groups. The first lens group 502 includes two negative power lens elements 509, 510. The first lens element 509 is spherical and the second lens element 510 is aspherical. Both the object (S3) and image (S4) surface of this lens element 510 are aspherical. The second lens group 503 has positive power, and includes two spherical lens elements 511, 512. Lens groups two 503 and three 504 are separated by an aperture stop 505. The third lens group 504 has positive power and includes five lens elements 513, 514, 515, 516, 517. The lens elements 514, 515, 516 are a cemented triplet. A filter 506 is shown in the design between the third lens group and the image plane 507. In one embodiment the wide angle fovea lens 501 of FIG. 5 consists solely of the lens elements as shown. In another embodiment additional lens elements may be added to the design. However, the lens 501, with just the lens elements 509-517, as shown, satisfy the parametric equations 2-7. Only the first lens group 502 includes an aspheric element 510. All of the lens elements of groups two 503 and three 504 are spherical. In preferred embodiments, at least one of the positive lens elements in group 2 and 3 is made with materials having a negative dn/dT value where n is the index of refraction at d-line, and T is the temperature. A specific example of a lens made with the design of FIG. 5 is shown below as Example 5.

EXAMPLES

Five specific examples satisfying the description of the invented wide angle fovea lens follow. Each of the examples represent a wide angle fovea lens with a field of view of 100° or greater, made according to the descriptions of FIGS. 1-5. All are comprised of three lens groups as described above and include a single aspheric lens in the first lens group and all lens elements in groups two and three are spherical lens elements. All examples satisfy parametric equations 2-7.

Example 1

As shown and discussed in conjunction with FIG. 1, The example wide angle lens includes: Lens element number 1

(bounded by surface 1 and 2), the aspheric element, is the first lens group. Lens element number 2 (bounded by surface 3 and 4) is the second lens group. Lens element 3, 4 and 5 from surface 6 to 10 make up the $3^{rd}$ group. All elements in group 2 and 3 are spherical.

TABLE 1A

Lens parameters for Example 1 according to FIG. 1

| Surface | Type | Radius | Thickness | Nd | Abbe# | Diameter | Conic |
|---|---|---|---|---|---|---|---|
| 1 | Aspherical | 4.90 | 2.82 | 1.81 | 40.73 | 9.94 | −0.20 |
| 2 | Aspherical | 2.17 | 3.11 | | | 6.87 | −0.69 |
| 3 | Spherical | 18.47 | 4.76 | 1.76 | 52.33 | 6.60 | 0.00 |
| 4 | Spherical | −15.26 | 1.25 | | | 5.95 | 0.00 |

TABLE 1A-continued

Lens parameters for Example 1 according to FIG. 1

| Surface | Type | Radius | Thickness | Nd | Abbe# | Diameter | Conic |
|---|---|---|---|---|---|---|---|
| STO 5 | | | 0.44 | | | 5.29 | 0.00 |
| 6 | Spherical | 13.25 | 2.33 | 1.50 | 81.59 | 5.75 | 0.00 |
| 7 | Spherical | −12.28 | 0.77 | | | 6.14 | 0.00 |
| 8 | Spherical | 10.20 | 3.01 | 1.59 | 68.62 | 6.80 | 0.00 |
| 9 | Spherical | −6.62 | 0.40 | 1.92 | 20.88 | 6.87 | 0.00 |
| 10 | Spherical | −18.79 | 5.20 | | | 7.11 | 0.00 |
| IMA | | | | | | 7.94 | 0.00 |

TABLE 1B

Aspheric formula parameters for surfaces S1 and S2 of Example 1

| Surface 1 | Aspheric Parameters |
|---|---|
| Coeff on r 4 | −1.94E−03 |
| Coeff on r 6 | −8.42E−05 |
| Coeff on r 8 | −4.14E−06 |
| Coeff on r 10 | 3.49E−07 |
| Coeff on r 12 | −7.25E−09 |

| Surface 2 | Aspheric Parameters |
|---|---|
| Coeff on r 4 | −4.91E−03 |
| Coeff on r 6 | −1.31E−03 |
| Coeff on r 8 | 1.58E−04 |
| Coeff on r 10 | −1.52E−05 |
| Coeff on r 12 | 1.01E−06 |

TABLE 1B-continued

Aspheric formula parameters for surfaces S1 and S2 of Example 1

| Coeff on r 14 | −3.65E−08 |
|---|---|
| Coeff on r 16 | 1.89E−10 |

Example 2

A second example of a fovea lens design uses the design as shown in FIG. 2. The $1^{st}$ group comprises two elements 209, 210. The second lens element 210 is the aspherical element having surfaces S3 and S4. Both lens elements in the first group have negative power. Two elements 211, 212 are in the second group 203. Two elements 213, 214 are the third group 204. All elements in group 2 and 3 are spherical. This design has a field angle of +/−60° with a relative aperture of F/1.6.

TABLE 2A

Lens parameters for Example 2 according to FIG. 2

| Surface | Type | Radius | Thickness | Nd | Abbe# | Diameter | Conic |
|---|---|---|---|---|---|---|---|
| 1 | SPHERICAL | 90.85 | 1.00 | 1.729164, | 54.67 | 12.49 | 0.00 |
| 2 | SPHERICAL | 17.47 | 0.10 | | | 10.46 | 0.00 |
| 3 | ASPHERICAL | 6.38 | 3.15 | 1.809995, | 41.00 | 10.17 | −2.54 |
| 4 | ASPHERICAL | 2.60 | 2.26 | | | 7.13 | −1.10 |
| 5 | SPHERICAL | 48.52 | 4.65 | 1.903663, | 31.42 | 7.29 | 0.00 |
| 6 | SPHERICAL | −14.62 | 2.14 | | | 7.92 | 0.00 |
| 7 | SPHERICAL | 18.95 | 3.08 | 1.592824, | 68.62 | 7.31 | 0.00 |
| 8 | SPHERICAL | −9.57 | 0.57 | | | 6.74 | 0.00 |
| STO | SPHERICAL | Infinity | 0.38 | | | 5.52 | 0.00 |
| 10 | SPHERICAL | 16.42 | 2.88 | 1.696800, | 55.53 | 5.88 | 0.00 |
| 11 | SPHERICAL | −4.76 | 2.43 | 1.846666, | 23.79 | 6.13 | 0.00 |
| 12 | SPHERICAL | −17.06 | 3.44 | | | 6.99 | 0.00 |
| 13 | SPHERICAL | Infinity | 0.50 | 1.516797, | 64.21 | 7.59 | 0.00 |
| 14 | SPHERICAL | Infinity | 2.00 | | | 7.64 | 0.00 |
| IMA | SPHERICAL | Infinity | | | | 7.96 | 0.00 |

TABLE 2B

Aspheric formula parameters for surfaces S3 and S4 of Example 2

| Surface 3 | Aspheric Parameters |
|---|---|
| Coefficient on r^2 | −2.03E−10 |
| Coefficient on r^4 | −5.85E−04 |
| Coefficient on r^6 | −4.97E−05 |
| Coefficient on r^8 | −2.83E−07 |
| Coefficient on r^10 | 1.10E−07 |
| Coefficient on r^12 | −3.27E−09 |
| Coefficient on r^14 | 3.17E−11 |

| Surface 4 | Aspheric Parameters |
|---|---|
| Coefficient on r^2 | 3.47E−10 |
| Coefficient on r^4 | −1.48E−03 |
| Coefficient on r^6 | −2.00E−04 |
| Coefficient on r^8 | 1.71E−05 |
| Coefficient on r^10 | −3.32E−07 |
| Coefficient on r^12 | −2.89E−09 |

Example 3

A third example of a fovea lens design uses the design as shown in FIG. 3. The $1^{st}$ group comprises two elements 309, 310. The second lens element 310 is the aspherical element having surfaces S3 and S4. Both lens elements in the first group have negative power. Two elements 311, 312 are in the second group 303. Three elements 313, 314, 315 are the third group 304. All elements in group 2 and 3 are spherical. This design has a field angle of +/−60° with a relative aperture of F/1.6.

TABLE 3A

Lens parameters for Example 3 according to FIG. 3

| Surface | Type | Radius | Thickness | Nd | Abbe# | Diameter | Conic |
|---|---|---|---|---|---|---|---|
| 1 | SPHERICAL | 84.73 | 0.98 | 1.50 | 81.59 | 13.12 | 0.00 |
| 2 | SPHERICAL | 11.03 | 0.06 | | | 10.09 | 0.00 |
| 3 | ASPHERICAL | 4.57 | 2.57 | 1.77 | 49.24 | 9.87 | −4.38 |
| 4 | ASPHERICAL | 2.32 | 2.57 | | | 7.35 | −0.77 |
| 5 | SPHERICAL | −36.28 | 2.87 | 1.88 | 40.81 | 7.36 | 0.00 |
| 6 | SPHERICAL | −11.31 | 2.52 | | | 7.74 | 0.00 |
| 7 | SPHERICAL | 25.92 | 3.82 | 1.59 | 68.62 | 6.63 | 0.00 |
| 8 | SPHERICAL | −9.43 | 0.94 | | | 6.10 | 0.00 |
| STO | SPHERICAL | Infinity | 0.09 | | | 5.35 | 0.00 |
| 10 | SPHERICAL | 13.29 | 1.42 | 1.59 | 68.62 | 5.62 | 0.00 |
| 11 | SPHERICAL | −35.74 | 0.09 | | | 5.87 | 0.00 |
| 12 | SPHERICAL | 26.15 | 2.26 | 1.50 | 81.59 | 5.99 | 0.00 |
| 13 | SPHERICAL | −7.45 | 2.11 | 1.95 | 17.94 | 6.16 | 0.00 |
| 14 | SPHERICAL | −16.42 | 0.49 | | | 6.86 | 0.00 |
| 15 | SPHERICAL | Infinity | 0.39 | 1.52 | 64.21 | 7.00 | 0.00 |
| 16 | SPHERICAL | Infinity | 4.29 | | | 7.04 | 0.00 |
| IMA | SPHERICAL | Infinity | | | | 7.77 | 0.00 |

TABLE 3B

Aspheric formula parameters for surfaces S3 and S4 of Example 3

| Surface 3 | Aspheric Parameters |
|---|---|
| Coefficient on r^2 | 1.83E−11 |
| Coefficient on r^4 | 3.21E−03 |
| Coefficient on r^6 | −3.37E−04 |
| Coefficient on r^8 | 9.81E−06 |
| Coefficient on r^10 | −1.02E−07 |

TABLE 3B-continued

Aspheric formula parameters for surfaces S3 and S4 of Example 3

| Surface 4 | Aspheric Parameters |
|---|---|
| Coefficient on r^2 | 4.48E−11 |
| Coefficient on r^4 | −2.96E−03 |
| Coefficient on r^6 | −6.95E−04 |
| Coefficient on r^8 | 4.61E−05 |
| Coefficient on r^10 | −1.20E−06 |

Example 4

A fourth example of a fovea lens design uses the design as shown in FIG. 4. The 1$^{st}$ group comprises two elements 409, 410. The second lens element 410 is the aspherical element having surfaces S3 and S4. Both lens elements in the first group have negative power. Two elements 411, 412 are in the second group 403. Three elements 413, 414, 415 are the third group 404. All elements in group 2 and 3 are spherical. This design has a field angle of +/−66° with a relative aperture of F/1.6.

TABLE 4A

Lens parameters for Example 4 according to FIG. 4

| Surface | Type | Radius | Thickness | Nd | Abbe# | Diameter | Conic |
|---|---|---|---|---|---|---|---|
| 1 | SPHERICAL | 42.27 | 1.00 | 1.60 | 60.63 | 13.67 | 0.00 |
| 2 | SPHERICAL | 10.77 | 0.10 | | | 10.53 | 0.00 |
| 3 | ASPHERICAL | 4.62 | 2.50 | 1.74 | 49.33 | 10.29 | −3.14 |
| 4 | ASPHERICAL | 2.41 | 2.77 | | | 7.30 | −0.71 |
| 5 | SPHERICAL | −18.52 | 3.67 | 1.88 | 40.81 | 7.29 | 0.00 |
| 6 | SPHERICAL | −11.19 | 2.29 | | | 8.10 | 0.00 |
| 7 | SPHERICAL | 14.55 | 2.69 | 1.59 | 68.62 | 7.71 | 0.00 |
| 8 | SPHERICAL | −10.40 | 1.03 | | | 7.32 | 0.00 |
| STO | SPHERICAL | Infinity | 1.06 | | | 5.60 | 0.00 |
| 10 | SPHERICAL | 33.03 | 2.94 | 1.68 | 55.56 | 6.34 | 0.00 |
| 11 | SPHERICAL | −4.99 | 0.40 | 1.85 | 23.79 | 6.74 | 0.00 |
| 12 | SPHERICAL | −25.96 | 1.42 | | | 7.31 | 0.00 |
| 13 | SPHERICAL | 14.88 | 1.58 | 1.80 | 46.57 | 8.42 | 0.00 |
| 14 | SPHERICAL | Infinity | 0.50 | | | 8.42 | 0.00 |
| 15 | SPHERICAL | Infinity | 0.50 | 1.52 | 64.21 | 8.41 | 0.00 |
| 16 | SPHERICAL | Infinity | 4.05 | | | 8.41 | 0.00 |
| IMA | SPHERICAL | Infinity | | | | 8.35 | 0.00 |

TABLE 4B

Aspheric formula parameters for surfaces S3 and S4 of Example 4

| Surface 3 | Aspheric Parameters |
|---|---|
| Coefficient on r^2 | −3.72E−09 |
| Coefficient on r^4 | 1.82E−03 |
| Coefficient on r^6 | −1.74E−04 |
| Coefficient on r^8 | 8.20E−07 |
| Coefficient on r^10 | 1.67E−07 |
| Coefficient on r^12 | −4.42E−09 |

TABLE 4B-continued

Aspheric formula parameters for surfaces S3 and S4 of Example 4

| Coefficient on r^14 | 3.29E-11 |
| --- | --- |
| Coefficient on r^16 | 0.00E+00 |

| Surface 4 | Aspheric Parameters |
| --- | --- |
| Coefficient on r^2 | 3.99E-10 |
| Coefficient on r^4 | -2.58E-03 |
| Coefficient on r^6 | -4.61E-04 |
| Coefficient on r^8 | 9.73E-06 |
| Coefficient on r^10 | 8.25E-07 |
| Coefficient on r^12 | -4.88E-08 |

Example 5

A fifth example of a fovea lens design uses the design as shown in FIG. 5. The 1$^{st}$ group comprises two elements 509, 510. The second lens element 510 is the aspherical element having surfaces S3 and S4. Both lens elements in the first group have negative power. Two elements 511, 512 are in the second group 503. five elements 513-517 are the third group 504. All elements in group 2 and 3 are spherical. This design has a field angle of +/-63° with a relative aperture of F/1.6.

TABLE 5A

Lens parameters for Example 5 according to FIG. 5

| Surface | Type | Radius | Thickness | Nd | Abbe* | Diameter | Conic |
| --- | --- | --- | --- | --- | --- | --- | --- |
| 1 | SPHERICAL | 19.36 | 1.00 | 1.78 | 25.72 | 13.09 | 0.00 |
| 2 | SPHERICAL | 11.76 | 0.05 | | | 10.89 | 0.00 |
| 3 | ASPHERICAL | 4.86 | 2.82 | 1.74 | 49.33 | 10.63 | -4.06 |
| 4 | ASPHERICAL | 2.33 | 3.05 | | | 6.96 | -0.93 |
| 5 | SPHERICAL | -7.09 | 2.69 | 1.77 | 49.61 | 6.99 | 0.00 |
| 6 | SPHERICAL | -9.23 | 0.05 | | | 7.85 | 0.00 |
| 7 | SPHERICAL | 23.51 | 1.69 | 1.95 | 32.32 | 7.80 | 0.00 |
| 8 | SPHERICAL | -17.37 | 3.72 | | | 7.71 | 0.00 |
| STO | Spherical | Infinity | 0.00 | | | 5.30 | 0.00 |
| 10 | SPHERICAL | 13.13 | 1.46 | 1.59 | 68.62 | 5.30 | 0.00 |
| 11 | SPHERICAL | -12.08 | 0.05 | | | 5.47 | 0.00 |
| 12 | SPHERICAL | 25.18 | 2.13 | 1.50 | 81.59 | 5.55 | 0.00 |
| 13 | SPHERICAL | -5.92 | 0.39 | 1.85 | 23.79 | 5.61 | 0.00 |
| 14 | SPHERICAL | 7.33 | 1.50 | 1.59 | 68.62 | 6.00 | 0.00 |
| 15 | SPHERICAL | 110.69 | 1.28 | | | 6.38 | 0.00 |
| 16 | SPHERICAL | 11.07 | 2.03 | 2.00 | 25.44 | 9.15 | 0.00 |
| 17 | SPHERICAL | -46.73 | 0.50 | | | 9.14 | 0.00 |
| 18 | SPHERICAL | Infinity | 0.40 | 1.52 | 64.21 | 8.96 | 0.00 |
| 19 | SPHERICAL | Infinity | 3.32 | | | 8.90 | 0.00 |
| IMA | SPHERICAL | Infinity | | | | 8.09 | 0.00 |

TABLE 5B

Aspheric formula parameters for surfaces S3 and S4 of Example 5

| Surface 3 | Aspheric Parameters |
| --- | --- |
| Coefficient on r^2 | 1.53E-11 |
| Coefficient on r^4 | 2.41E-03 |
| Coefficient on r^6 | -2.33E-04 |
| Coefficient on r^8 | 6.08E-06 |
| Coefficient on r^10 | -5.58E-08 |

| Surface 4 | Aspheric Parameters |
| --- | --- |
| Coefficient on r^2 | 2.93E-10 |
| Coefficient on r^4 | -1.09E-03 |
| Coefficient on r^6 | -5.12E-04 |
| Coefficient on r^8 | 3.52E-05 |
| Coefficient on r^10 | -7.41E-07 |

Example 1 through 5 satisfy parameter range equations (2) through (7). Each of the examples have a field of view of at least 100 degrees. Detailed values for each example are given in Table 6. Equation (7) is also satisfied by all examples.

TABLE 6

Examples 1-5 Summary

| Expression | Example 1 | Example 2 | Example 3 | Example 4 | Example 5 |
| --- | --- | --- | --- | --- | --- |
| F | 6.37 | 5.32 | 5.32 | 5.31 | 5.58 |
| F1 | -9.01 | -5.96 | -7.15 | -7.38 | -8.13 |
| Fa | -9.01 | -8.61 | -12.16 | -13.1 | -11.42 |
| IH50 | 3.82 | 3.61 | 3.53 | 3.61 | 3.623 |
| Ta | 2.82 | 3.15 | 2.57 | 2.50 | 2.82 |
| TTL | 24.00 | 28.60 | 27.50 | 28.50 | 28.14 |
| Ta/F | 0.44 | 0.59 | 0.48 | 0.47 | 0.51 |
| Ta/TTL | 0.12 | 0.11 | 0.09 | 0.09 | 0.10 |
| [Fa]/F | 1.41 | 1.62 | 2.29 | 2.47 | 2.05 |
| [F1]/F | 1.41 | 1.12 | 1.34 | 1.39 | 1.46 |
| IH50/(F*tan(50)) | 0.50 | 0.57 | 0.56 | 0.57 | 0.54 |

A Camera

Figure 6:
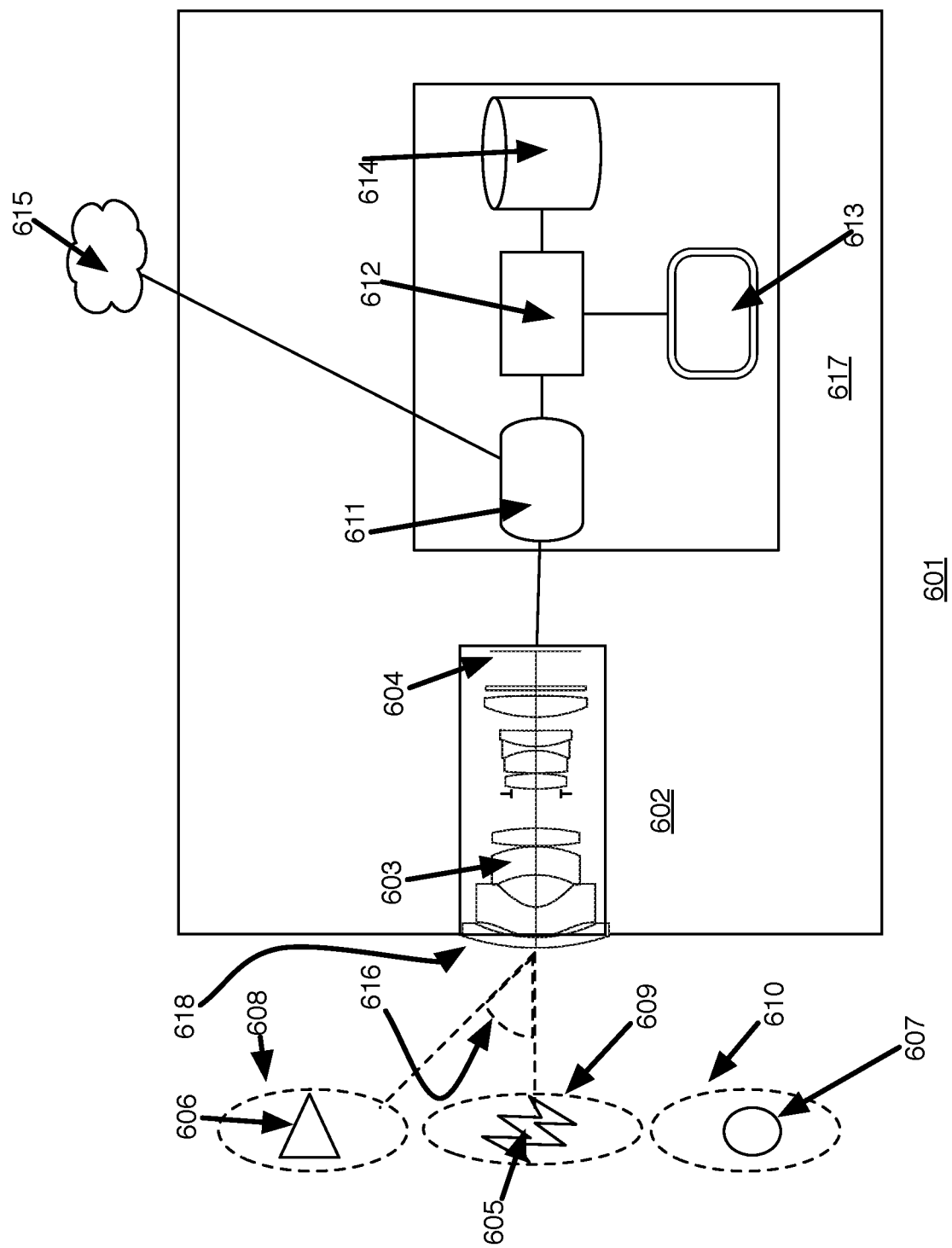
FIG. 6 is a diagram of a camera using any of the lens designs of FIGS. 1-5.

In another embodiment any of the described lens embodiments shown in FIGS. 1-5 is selected for inclusion in a camera system. The camera system is suitable for automotive, surveillance and any other application that benefits from the design parameters, especially that of higher magnification for objects nearer the optical axis. Referring now to FIG. 6, a camera 601 is comprised of a lens 602 and a computing device 617. In one embodiment the lens is a wide angle fovea lens comprising from object to image, 3 lens groups with a first negative power lens group having a single aspheric lens element, a second positive power lens group, an aperture stop and a third positive power lens group wherein the lens elements of the second and third lens groups are all spherical elements and the lens 602 satisfies the parametric equations 2-7. In another embodiment, the lens 602 is one selected from those described in FIGS. 1-5. In another embodiment the lens 602 is one selected from examples 1-5. Within the lens 602 are lens elements as already described and an image sensor 604 located at the image plane of the lens system. The lens is fitted to an aperture 618 in the camera 601 and receives light from objects 605, 606, 607. The objects are located in regions 608, 609, 610 arrayed at varying angles 616 from the optical axis of the lens system. The wide angle fovea lens provides that the objects located in regions 609 nearer the optical axis are magnified higher than objects located in regions 608, 610 that are located at angles away from the optical axis. Although described as regions the degree of magnification across the field of view of the camera varies continuously as a function of the incident angle 616. The camera further includes a computing device 617. The computing device includes a processor 612 that is connected to an input/output 611 that receives data from the image sensor and in one embodiment can also transmit data externally from the processor such as through wired or wireless means to a network 615, the network including a local area network, a wide area network and the Internet. The input/output device includes an analog to digital converter to accept analog data from the image sensor 604 and store the data digitally within the computing device. In another embodiment the analog to digital converter is incorporated into the image sensor 604 such that digital data is sent from the image sensor 604 to the computing device 617. The computing device further includes a user interface 613 that enables a user to interact with the camera in ways such as pushing a button to trigger data acquisition and ins some embodiments to enter parameters related to the image data acquisition. In one embodiment the camera includes a shutter (not shown) located on the object side of the image sensor 604. In another embodiment the camera is shutterless. The computing device further includes memory 614. The memory is used to store image data. In another embodiment the memory further includes program instructions that control the processor 612 for both image data acquisition, processing and storage of the acquired image data and transmission of data or processing results through the I/O 611 to an external network. In one embodiment the camera 601 is incorporated in a vehicle such as a car or a truck, airplane, and, drone and is used for guidance of the vehicle. In another embodiment the camera 601 is incorporated in a surveillance device.

SUMMARY

Wide angle fovea lens and a camera design using the lens are described. The lens has three lens groups and includes a single aspherical lens element. The lenses have higher magnification on the optical axis than at angles off the optical axis.

I claim:

1. A wide angle fovea lens having an optical axis, an image plane, and an effective focal length, the wide angle fovea lens comprising:

a. three lens groups located along the optical axis, in order from object to the image plane: group 1, group 2 and group 3, and,
   b. the group 1 having negative power, and, including no more than one aspheric lens element, the group 1 having an effective focal length and the aspheric lens element having a center thickness and an on-axis effective focal length, and,
   c. the group 2 having positive power and including only spherical lens elements, and,
   d. an aperture stop between the group 2 and the group 3, and,
   e. the group 3 having positive power and including only spherical lens elements, and,
   f. the wide angle fovea lens satisfying the conditions:

$IH(\Theta) < F^* \sin(\Theta)$, for $\Theta > 0$

Where $IH(\Theta)$ is an image height on the image plane of a chief ray at an angle $\Theta$ off-axis relative to the optical axis, and, F is the effective focal length of the fovea lens.

2. The wide angle fovea lens of claim 1 wherein at least one lens element in group 2 and group 3 is made of material having a negative dn/dT value, where n is the index of refraction of the material at d-line, and, T is temperature.

3. The wide angle fovea lens of claim 1 further satisfying the following parametric equation:

a. $0.4 < IH50/(F^*\mathrm{Tan}(50)) < 0.7$ where:
   F is the effective focal length of the wide angle fovea lens, and,
   IH50 is the image height at a half field angle +/−50 degrees.

4. The wide angle fovea lens of claim 1 further satisfying the following parametric equations:

a. $0.4 < Ta/F < 0.75$
   b. $0.08 < Ta/TTL < 0.25$
   c. $1.2 < |Fa|/F < 2.7$
   d. $1 < |F1|/F < 1.6$ where:
   F is the effective focal length of the wide angle fovea lens, and,
   Fa the on-axis effective focal length of the aspheric element, and,
   F1 is the effective focal length of group 1, and,
   Ta is the center thickness of the aspheric element, and,
   TTL is an on-axis distance from the most object side of the surface of the wide angle fovea lens to an image plane.

* * * * *